United States Patent [19]

Steveley

[11] Patent Number: 4,777,983

[45] Date of Patent: Oct. 18, 1988

[54] APPARATUS AND METHOD OF AN ACCUMULATOR WITH RIGID SECONDARY DIAPHRAGM

[75] Inventor: Kip R. Steveley, Farmington Hills, Mich.

[73] Assignee: General Motors Corporation, Detroit, Mich.

[21] Appl. No.: 86,525

[22] Filed: Aug. 18, 1987

[51] Int. Cl.[4] .................... F16L 55/04

[52] U.S. Cl. .................... 138/30; 138/31

[58] Field of Search .................... 138/26, 30, 31; 220/85 B

[56] References Cited

U.S. PATENT DOCUMENTS

| | | | |
|---|---|---|---|
| 1,984,868 | 12/1934 | Deming | 138/30 X |
| 2,016,247 | 10/1935 | Simmons | 138/30 X |
| 2,132,952 | 10/1938 | Hewitt | 138/30 |
| 2,192,548 | 3/1940 | Gunderson | 138/30 X |
| 3,075,558 | 1/1963 | Von Forell | 138/31 X |
| 3,559,727 | 2/1971 | Hill et al. | 138/31 X |
| 3,630,235 | 12/1971 | Wiley et al. | 138/31 |
| 3,677,334 | 7/1972 | Bathia et al. | 138/31 X |
| 4,209,185 | 6/1980 | St. Clair et al. | 138/30 X |
| 4,373,872 | 2/1983 | Kemmner et al. | 138/30 X |
| 4,691,739 | 9/1987 | Gooden | 138/31 |

FOREIGN PATENT DOCUMENTS

| | | | |
|---|---|---|---|
| 1961140 | 6/1971 | Fed. Rep. of Germany | 138/30 |
| 827859 | 2/1960 | United Kingdom | 138/30 |
| 2094888 | 9/1982 | United Kingdom | 138/30 |

*Primary Examiner*—James E. Bryant, III

*Attorney, Agent, or Firm*—Ernest E. Helms

[57] ABSTRACT

An apparatus and method of utilization of the same of an accumulator with an internal spring biased secondary diaphragm. The secondary diaphragm shapes the flexible membrane of the accumulator when pressurized fluid is admitted into the accumulator thereby minimizing the tensional forces experienced within the membrane.

5 Claims, 1 Drawing Sheet

APPARATUS AND METHOD OF AN ACCUMULATOR WITH RIGID SECONDARY DIAPHRAGM

FIELD OF THE INVENTION

The field of the present invention is that of accumulators. More particularly the field of the present invention is that of accumulators suitable for use in vehicle braking systems.

DISCLOSURE STATEMENT

It is known in the art of automotive braking systems to utilize accumulators to store brake fluid under pressure for reserve braking capability and to supplement the hydraulic pump flow during anti-skid braking applications. Many of the above-described accumulators typically have a steel shell with an inlet end shaped generally as an ellipsoid. Provided within the shell of the accumulator is an elastomeric membrane (alternatively referred to as the bladder). The membrane is typically secured to the wall of the shell by a ring. A gas, typically nitrogen, is used to charge the accumulator. When the accumulator is in storage the membrane will typically lay flat along the walls of the inlet end of the accumulator being shaped very similar to the inlet end of the shell. When a fluid of sufficient pressure is admitted into the inlet of the accumulator, the membrane will be pushed upward in a generally wrinkled fashion. The membrane will seek to equalize the tensional forces on the membrane, however, this is typically not as perfect as would be desired. It is desirable to minimize the tensional forces experienced by the membrane when the accumulator is in use.

SUMMARY OF THE INVENTION

The present invention provides a fluid charged accumulator having a secondary diaphragm or cap member. The cap is ellipsoid shape and generally similar to the shell and in a preferred body presents a mirror image of the inlet end of the accumulator shell. The cap is spring biased and serves to shape the membrane when a fluid of sufficient pressure is admitted into the accumulator. Because of the shaping of the membrane by the cap, the torsional forces in the membrane can be minimized.

It is an object of the present invention to provide an apparatus and method of utilization of the same of an accumulator with a secondary rigid diaphragm or cap.

It is an object of the present invention to provide a fluid charge accumulator for a pressurized fluid including a shell having a fluid charged end, and an inlet end shaped generally as an ellipsoid, a flexible membrane separating the charging fluid from the shell inlet, and a cap adjacent the membrane separated from the inlet end by the membrane and being spring biased toward the shell inlet end and having a shape generally similar to the inlet end of the shell whereby the membrane is shaped by the cap to minimize tension forces in the membrane when a pressurized fluid of sufficient pressure is admitted into the inlet end of the shell.

It is another object of the present invention to provide a fluid charged accumulator for a pressurized fluid including a shell having a fluid charged end, and an inlet end shaped generally as an ellipsoid, an elastomeric membrane separating the fluid charged end from the inlet end, the membrane being shaped generally similar to the inlet end and the membrane having a central mound, and a cap adjacent the membrane having a central aperture for seating the membrane mound, the cap being separated from the inlet end by the membrane and being biased by a coil spring towards the inlet end, and the cap having a shape generally similar to the inlet end of the shell with a concave surface towards the inlet whereby the membrane is shaped by the cap to minimize tension forces in the membrane when a pressurized fluid of sufficient pressure is admitted into the inlet end of the shell.

It is still another object of the present invention to provide a method of minimizing the tension forces within a membrane of a fluid charged accumulator having a shell with an inlet end shaped generally as an ellipsoid and an elastomeric membrane separating the charging fluid of the accumulator from the inlet end, the method including separating a cap having a shape generally similar to the inlet end of the shell from the inlet end with the membrane, spring biasing the cap to a position adjacent with the membrane, and admitting a pressurized fluid into the inlet end and shaping the membrane with the cap whereby the tension forces in the membrane are minimized.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
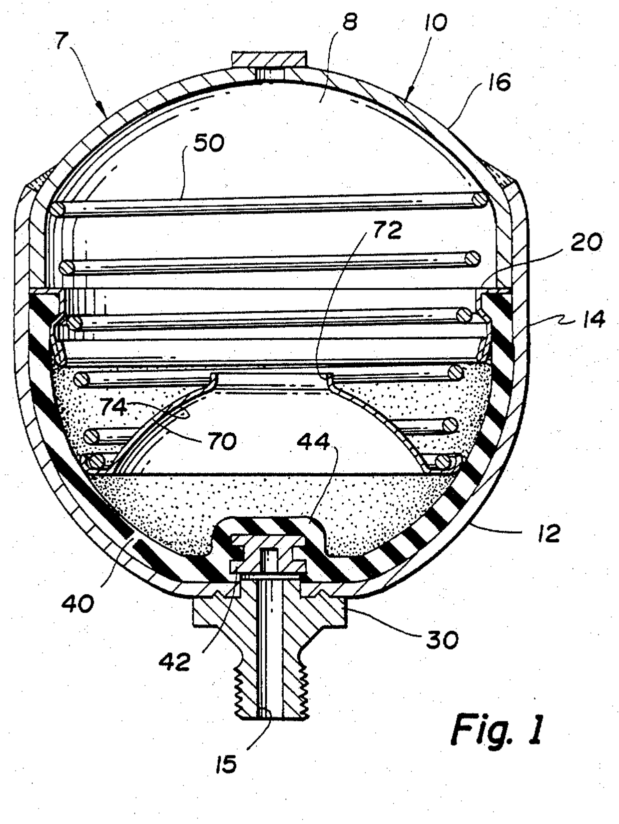
FIG. 1 is a sectional view of a preferred embodiment accumulator of the present invention before admittance of a pressurized fluid.
Figure 2:
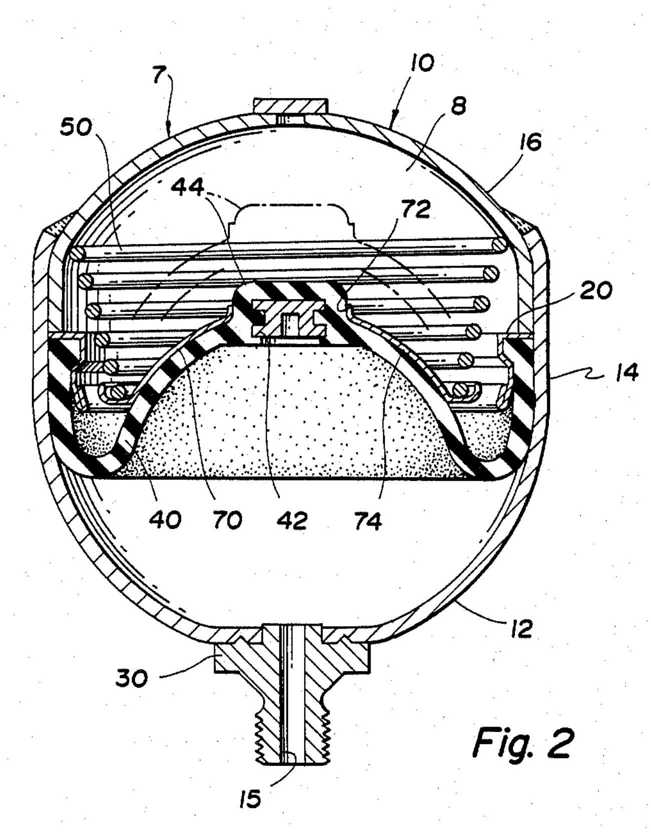
FIG. 2 is a sectional view similar to that of FIG. 1 however illustrating the position of the membrane after admittance of a pressurized fluid.

Referring to FIGS. 1 and 2, the accumulator 7 typically has a metal shell 10. The accumulator shell 10 is typically made of a inlet end 12, shaped as an ellipsoid, a generally straight cylindrical portion 14, and a top 16 welded to the cylindrical lower portion 14. The inlet end 12 has an opening 15 allowing passage of the brake fluid into the accumulator 10. Underneath the top 16 is a retaining ring 20. Also at the inlet end 12 there is provided a stud 30 allowing for threaded attachment of the accumulator 10 to the brake system line (not shown).

Connected with retaining ring 20 inside the shell 10 is a flexible elastomeric first diaphragm of membrane 40. The elastomeric membrane 40 which separates the fluid (gas) charged end 8 from the inlet end 12 of the accumulator 10. When the accumulator 7 is empty the charging gas places the membrane 40 along the inlet end 12 of the shell 10. The membrane 40 in the free state is generally shaped similar to the inlet end 12 of the shell 10 in most instances.

The membrane 40 has encapsulated therein a closure stud 42 which makes a mound 44 in the membrane 40. The stud 42 is provided to prevent damage to the membrane 40 when there is an absence of pressurized brake fluid within the accumulator by preventing the elastomeric portion of the membrane 40 from being forced against the inlet opening 15.

Separated from the inlet end 12 and adjacent to membrane 40 is a rigid second diaphragm hereinafter referred to as the cap 70. The cap 70 has an ellipsoid shape generally similar to the shape of the inlet end 12 of the shell 10. The concave surface 74 of the cap 70 faces is towards the inlet end 12 mirroring the ellipsoid shape of the inlet end 12 of the shell 10. The concave surface 74 is spaced from the membrane 40 when pressurized fluid is not within the accumulator 7. The cap 10 is spring biased in position by a coil spring 50 with a converging diameter which is mounted within the shell 10. The cap 70 also has a central aperture 72 to nest the mound 44 of the membrane 40.

Referring to FIG. 2, upon admittance of pressurized brake fluid into the accumulator 7 of a sufficient amount, the membrane 40 will rise and contact the cap 70 concave surface 74. Upon further upward movement the membrane will push the cap 70 up along with spring 50. The cap 70 shapes the membrane 40 thereby minimizing the tension force that are experienced in the membrane 40. Secondly, the cap 70 along with spring 50 provides a slight amount of added storage of energy to the accumulator 7 above that provided by the charging fluid alone. Permability of the membrane 40 is reduced when the membrane is urged against a rigid hard surface such as the shell 10 when the inlet end is inlet end 12 is empty (during storage). Therefore by providing such a hard surface, the cap 70 may be a variable which can help in reducing the permability of membrane 40 when the accumulator 7 is in use. However, the effect on permability by cap 70 has been difficult to quantify.

Upon removal of the pressurized fluid, the membrane 40 will again assume a position adjacent the inlet end 12 of the shell 10 away from the concave surface 74 of the cap 70 as described previously for FIG. 1.

The present invention provides a method of minimizing the tension forces within a membrane 40 of a fluid charged accumulator 7 having a shell 10 with an inlet end 12 shaped generally as an ellipsoid and an elastomeric membrane 40 separating the charging fluid of the accumulator from the inlet end 12, the method including the following steps:

1. Separating a cap 70 having a shape generally similar to the inlet end 12 of the shell 10 from the inlet 12 end with the membrane 40;

2. Spring biasing 50 the cap 70 to a position adjacent with the membrane 40;

3. Admitting a pressurized fluid to the inlet end 12 and shaping the membrane 40 with the cap 70 whereby the tension forces in the membrane 40 are minimized.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An accumulator charged by a charging fluid for storing a fluid under pressure, said accumulator in combination comprising;

a shell having a fluid charged end, and said shell having an inlet end shaped generally as an elllipsoid;

a first flexible diaphragm separating said charging fluid from said shell inlet end;

a spring mounted within said shell; and a rigid second diaphragm adjacent said first diaphragm and being biased by said spring toward said shell inlet end and having an ellipsoid shape generally similar to said inlet end of said shell with a concave surface facing toward said inlet end, said concave surface being spaced from said first diaphragm when pressurized fluid is not within said accumulator and whereby said first diaphragm contacts said second diaphragm concave surface and is shaped by said second diaphragm to minimize tension forces in said first diaphragm when a pressurized fluid of sufficient amount is admitted into said inlet end of said shell.

2. An accumulator as described in claim 1 wherein said first diaphragm has a mound and said second diaphragm has a central aperture to accommodate said mound when a pressurized fluid of sufficient amount is admitted into said inlet end of said shell.

3. An accumulator as described in claim 1 wherein said spring is a coil spring having a converging diameter.

4. An accumulator charged by a charging fluid for storing a fluid under pressure, said accumulator in combination comprising:

a shell having a fluid charged end, and an inlet end shaped generally as an ellipsoid;

an elastomeric first diaphragm separating said fluid charged end from said inlet end, said membrane being shaped generally similar to said inlet end and said first diaphragm having a central mound;

a coil spring mounted within said shell; and a rigid second diaphragm adjacent said first diaphragm having a central aperture for seating said first diaphragm mound, said second diaphragm being separated from said inlet end by said first diaphragm and being biased by said coil spring towards said inlet end, and said cap having a shape generally similar to said inlet end of said shell with a concave surface facing towards said inlet end, said concave surface being spaced from said first diaphragm when pressurized fluid is not within said accumulator and whereby said first diaphragm mound seats into said second diaphragm aperture and said first diaphragm is shaped by said second diaphragm to minimize tension forces in said first diaphragm when a pressurized fluid of sufficient amount is admitted into said inlet end of said shell.

5. A method of minimizing the tension forces within a first flexible diaphragm of a fluid charged accumulator having a shell with an inlet end shaped generally as an ellipsoid wherein said first flexible diaphragm separates the charging fluid of said accumulator from said inlet end, said method in combination comprising:

separating from said inlet end of said shell with said first diaphragm a rigid second diaphragm having an ellipsoid shape generally similar to said inlet end of said shell with a concave surface facing said inlet end and spaced away from said first diaphragm when said accumulator does not contain a pressurized fluid;

spring biasing said second diaphragm to a position adjacent with said membrane; and admitting a pressurized fluid into said inlet end thereby contacting said first diaphragm with said concave surface of said second diaphragm and shaping said first diaphragm with said second diaphragm whereby the tension forces in said first diaphragm are minimized.

* * * * *